(12) United States Patent
Fabre

(10) Patent No.: US 9,039,567 B2
(45) Date of Patent: May 26, 2015

(54) DEVICE WITH MULTIPLE REDUCTION GEAR TRANSMISSION BETWEEN A DRIVE SHAFT AND A PAIR OF PROPELLERS COAXIAL WITH THIS SHAFT

(71) Applicant: SNECMA, Paris (FR)

(72) Inventor: Adrien Jacques Philippe Fabre, Montrouge (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/321,956

(22) Filed: Jul. 2, 2014

(65) Prior Publication Data

US 2015/0011354 A1 Jan. 8, 2015

(30) Foreign Application Priority Data

Jul. 3, 2013 (FR) ...................................... 13 56505

(51) Int. Cl.
| | |
|---|---|
| *F16H 37/08* | (2006.01) |
| *B64D 35/04* | (2006.01) |
| *B64D 35/06* | (2006.01) |
| *F02C 3/067* | (2006.01) |
| *F02C 3/107* | (2006.01) |
| *F02C 7/36* | (2006.01) |
| *F16H 1/46* | (2006.01) |
| *F02C 7/06* | (2006.01) |
| *B64D 27/00* | (2006.01) |

(52) U.S. Cl.
CPC ............... *B64D 35/04* (2013.01); *B64D 35/06* (2013.01); *F02C 3/067* (2013.01); *F02C 3/107* (2013.01); *F02C 7/36* (2013.01); *F16H 37/0813* (2013.01); *F16H 1/46* (2013.01); *F02C 7/06* (2013.01); *F05D 2220/325* (2013.01); *F05D 2240/40* (2013.01); *F05D 2260/40311* (2013.01); *B64D 2027/005* (2013.01)

(58) Field of Classification Search
None
See application file for complete search history.

(56) References Cited

U.S. PATENT DOCUMENTS

| | | | | |
|---|---|---|---|---|
| 2,583,872 | A | * | 1/1952 | Newcomb ..................... 475/332 |
| 2,981,063 | A | * | 4/1961 | Wickman ......................... 60/791 |
| 3,207,003 | A | * | 9/1965 | Kronogård ....................... 475/31 |

FOREIGN PATENT DOCUMENTS

| | | |
|---|---|---|
| BE | 479 552 | 1/1948 |
| BE | 479 552 A | 1/1948 |
| DE | 10 2005 018 140 A1 | 11/2006 |
| FR | 847 990 | 10/1939 |
| FR | 847 990 A | 10/1939 |

OTHER PUBLICATIONS

French Preliminary Search Report issued Mar. 14, 2014 in French Application 13 56505, filed on Jul. 3, 2013 ( with English Translation of Categories of Cited Documents)

* cited by examiner

*Primary Examiner* — Dirk Wright
(74) *Attorney, Agent, or Firm* — Oblon, McClelland, Maier & Neustadt, L.L.P.

(57) ABSTRACT

A transmission to drive two propellers through a single shaft comprises several, generally three planetary gear systems, each of which comprises one principal element directly supported on fixed surrounding structures that resist cantilever forces, support the rotating bodies and carry fluid and electrical cable ducts to control the operation of the downstream propeller elsewhere than through the central shaft of the machine in which the volume is reduced.

12 Claims, 2 Drawing Sheets

Figure 1:
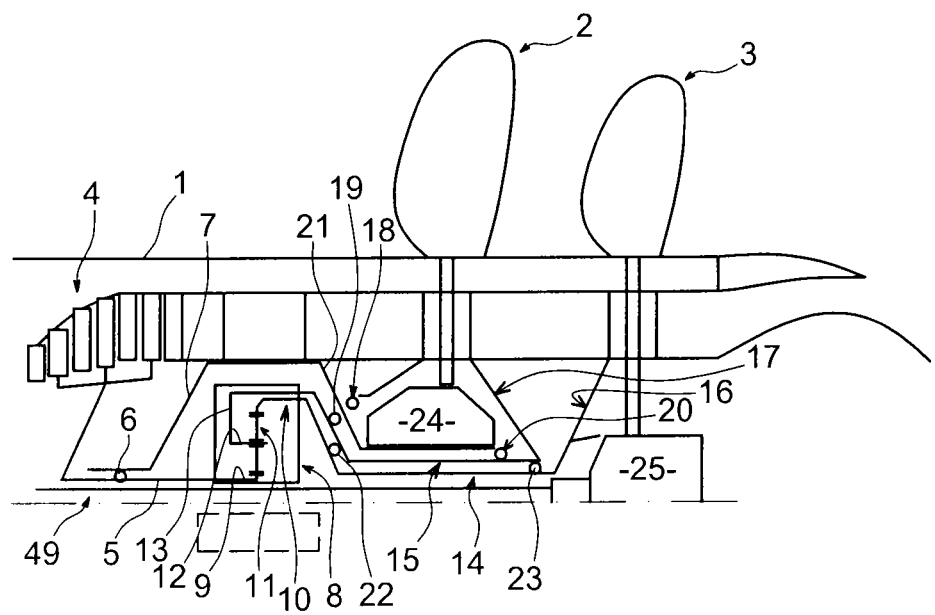

DEVICE WITH MULTIPLE REDUCTION GEAR TRANSMISSION BETWEEN A DRIVE SHAFT AND A PAIR OF PROPELLERS COAXIAL WITH THIS SHAFT

The subject of this invention is a device comprising a multiple reduction gear transmission between a drive shaft and a pair of propellers coaxial with this shaft.

Some aircraft are powered by two counter-rotating propellers driven by a single shaft and coaxial with it. The drive transmission is traditionally a planetary gear type transmission, in which the speed reduction and inversion of the rotation direction is done for one of the propellers. A planetary gear system comprises a toothed sun gear, a usually external ring gear also toothed surrounding the sun gear and toothed planet gears located between the ring gear and the sun gear and engaging with them. The planet gear carrier shafts are located on a common planet gear carrier. The sun gear is fixed to the turbine shaft, the ring gear is fixed to one of the propellers and the planet gear carrier is fixed to the other propeller. This transmission has the advantage that it is very simple because the input shaft and the two output shafts are connected to the three planetary gearing elements, but however it has some disadvantages because all elements of the planetary gear system are rotating, including for example sensitivity to misalignments, vibrations, orbiting that can create premature wear that cannot be predicted originally. Furthermore, the pitch of the propellers is variable and has to be controlled, which means that electrical or fluid energy has to be transmitted through supply networks to a control module called the PCM adjacent to each propeller. Cables and supply pipes to the downstream propeller furthest from the turbine shaft have to be arranged at the centre of the turbine shaft which is hollow, in a sheath that must prevent any contact with the turbine shaft rotating at high speed. This means that sufficient clearance must be provided between them, and the radius of the turbine shaft and therefore the radius of the sun gear and the entire reduction gear must be kept to a minimum value so as to respect the necessary speed reduction ratios. In practice, the reduction gear becomes fairly large.

A large amount of disassembly and repair work is necessary if any accidental contact occurs despite everything. Another disadvantage is that the bearings must be arranged between concentric support sleeves of the two propellers and rotate at very high rotation speeds because these sleeves are also counter rotating.

Such a device is disclosed in more detail in document FR-2 943 035-A, and document FR-2 94 615-A discloses a device for transfer of electrical or fluid energy to a control module comprising dynamic seals and rotating collectors.

In a more complicated design presented in DE 10 2005 018140 A, BE 479 552 A and FR 847 990 A, the transmission comprises two planetary gear systems connected to each other, in which one element of each controls one of the propellers. This more complex structure can lack stiffness. There may be severe constraints on the choice of propeller rotating speeds.

The subject of the invention is an improvement to this device, the purpose of which is to overcome the disadvantages listed above by disclosing a different transmission.

According to a general aspect, the invention relates to an aircraft propulsion device comprising a drive shaft, a pair of propellers coaxial with the drive shaft, and a transmission between the drive shaft and the pair of propellers, the transmission including a planetary gearing speed reduction device for the drive shaft, the reduction device comprising a plurality of planetary gear systems each comprising a toothed sun gear, a toothed ring gear and toothed planet gears mounted on a planet gear carrier and each engaged with the sun gear and the ring gear, the sun gear, the ring gear and the planet gear carrier forming three principal elements of each planetary gear system, one of the principal elements of two of the planetary gear systems being fixed to one of the propellers, characterised in that there are three planetary gear systems, one of the principal elements of a first of said three planetary gear systems is fixed to the drive shaft, a second and a third of said three planetary gear systems comprise the principal elements fixed to the propellers, and one of the principal elements of each of the planetary gear systems is fixed (stationary) to a fixed structure surrounding the drive shaft.

The use of three planetary gear systems instead of the single planetary gear system or the pair of planetary gear systems used in known art is the most specific characteristic of the invention. It makes one of the principal elements of each of the gearing systems fixed to the fixed structure of the machine, which is therefore designed to resist a large proportion of the static and dynamic forces applied in the transmission and thus to relieve the turbine shaft. It is hoped that misalignments, vibrations and assembly and operating defects in general can be reduced due to the higher stiffness obtained.

The cables and ducts carrying electricity and fluids to propeller control modules can conveniently pass through the fixed structure. The region of the shaft of the device is then unoccupied, which can reduce the radii of the turbine shaft and the reduction gears and therefore not increase or even reduce the size of the transmission despite the larger number of reduction gears. Counter rotating bearings can usually be avoided, because the bearings are now all located between the fixed part of the transmission and one of the rotating assemblies. Finally, speed reduction stresses can be respected when three planetary gear systems are used. These design constraints and the need to avoid collisions between the different rotating assemblies are the reasons why some specific embodiments are preferred in the general definition of the invention given below.

Several envisaged embodiments are presented below. The invention also relates to an aircraft propulsion device comprising a turbine shaft that is the drive shaft, a transmission according to any one of the previous claims and two counter rotating propellers that are the propellers coaxial with the drive shaft.

Figure 2:
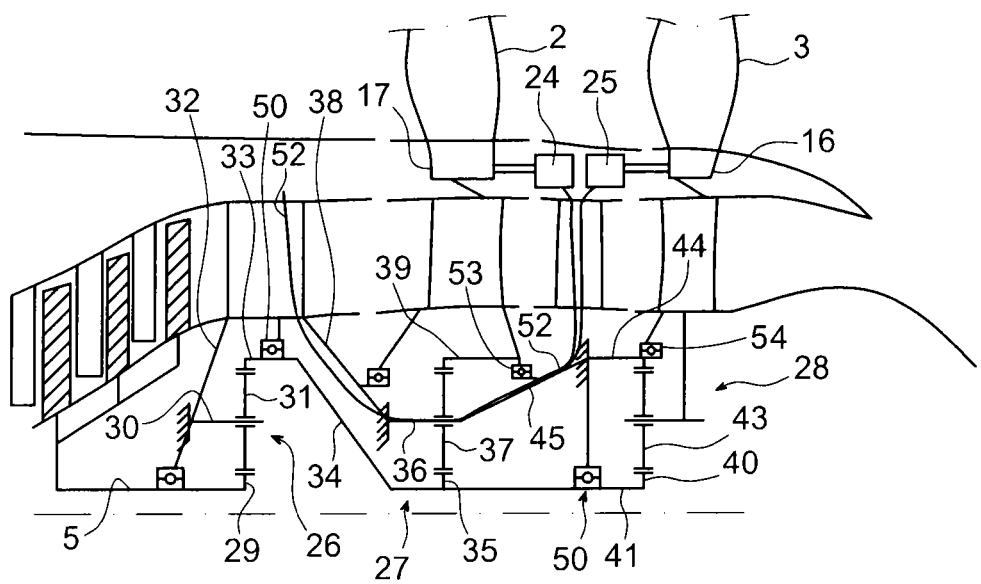
Figure 3:
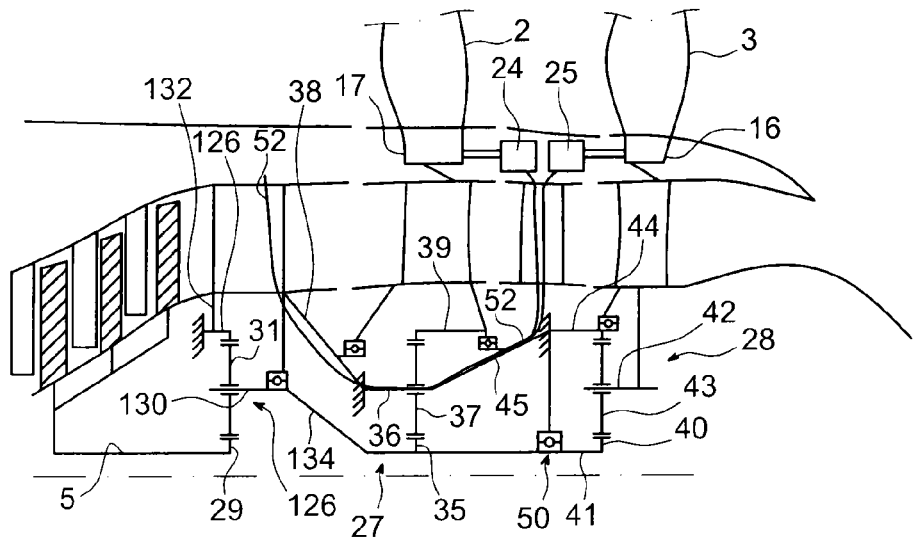
Figure 4:
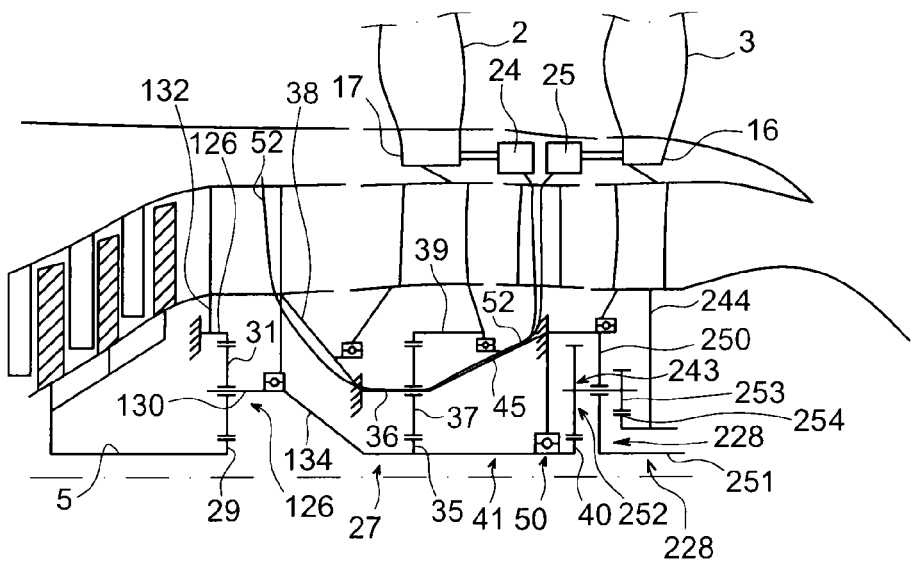

The invention will now be disclosed in more detail with reference to the following Figures:

FIG. 1 diagrammatically shows a known transmission; and FIGS. 2, 3 and 4 show three embodiments of the invention.

FIG. 1 shows a known design of an aircraft thruster assembly of the type used in the invention. The thruster assembly 1 comprises an upstream propeller 2 and a downstream propeller 3. A turbine 4 drives a turbine shaft 5 held by roller bearings in position along the centre line of the turbomachine to which the turbine shaft 5 belongs, and in particular, a forward roller bearing 6 supported by a fixed casing element 7. A reduction gear 8 comprises a sun gear 9 fixed to the end of the turbine shaft 5, an external ring gear 10 and planet gears 11 engaging with the sun gear 9 and the external ring gear 10 and rotating about the axes 12 supported by an annular planet gear carrier 13. The external ring gear 10 is fixed to a hub 16 of the downstream propeller 3 through a first hollow shaft 14, and the planet gear carrier 13 is fixed to a hub 17 of the upstream propeller 2 through a second hollow shaft 15 surrounding the first. Bearings 18, 19 and 20 support the second hollow shaft 15 and the body 17 on another fixed casing element 21, and other bearings 22 and 23 support the first hollow shaft 14 through the second hollow shaft 15. These other bearings 22 and 23 are counter rotating at high speed, since they have rings driven in opposite directions. The fixed casing element 21 contains pipes and cables leading to the control module 24 of the upstream propeller 2, while the control module 25 of the downstream propeller 3 is powered by cables and pipes located in a duct 49 passing through the centre line of the machine, inside the turbine shaft 5 that is hollow, and then through the second hollow shaft 14. The disadvantages of this type of embodiment are described above.

We will now disclose embodiments of the invention.

FIG. 2 shows a first of these embodiments. The turbine shaft 5 is not substantially different from that used in known art, nor is the upstream propeller 3 and the downstream propeller 3, and the arrangement still includes control modules 24 and 25 of the propellers 2 and 3.

The transmission now includes three planetary gear systems 26, 27 and 28, instead of the single planetary gear system 8 according to known art. Like the planetary gear system 8, each of the planetary gear systems 26, 27 and 28 comprises a central sun gear, an external ring gear surrounding the sun gear and planet gears engaged with them, with shafts supported by a common planet gear carrier. In this embodiment, the sun gear 29 of the first planetary gear system 26 is fixed to the end of the turbine shaft 5, the shafts 30 of the planet gears 31 are fixed to a fixed casing element 32 and the external ring gear 33 is fixed to the sun gear 35 of the second planetary gear system 27 through a conical hollow shaft 34. The shafts 36 of the planet gears 37 of this second planetary gear system 27 are fixed to another fixed casing element 38, fixed to the element 32 mentioned above. The external ring gear 39 of the second gearing system is fixed to the hub 17 of the upstream propeller 2. Therefore the fixed casing elements 32 and 38 therefore integrate the planet gear carriers of the planetary gear systems 26 and 27.

The sun gear 40 of the third planetary gear system 28 is fixed to the sun gear 35 of the second planetary gear system 27 through a cylindrical hollow shaft 41 fixed to the conical hollow shaft 34. The shafts 42 of the planet gears 43 of the third planetary gear system 28 are fixed to the hub 16 of the downstream propeller 3 which therefore corresponds to the planet gear carrier of the third planetary gear system 28. And the ring 44 of the third planetary gear system 28 is fixed to the shafts 36 of the second planetary gear system 27 by another fixed casing element 45.

Thus, the fixed casing forms a single piece with the planet gear carriers of the first two planetary gear systems 26 and 27, and the external ring 44 of the third planetary gear system 28. Therefore the fixed structures of the aircraft and particularly of the motor directly support one of the principal elements of each of the planetary gear systems 26, 27 and 28. Furthermore, the rotating assembly extending from the external ring gear 33 of the first planetary gear system 26 to the sun gear 40 of the third planetary gear system 28 and therefore still comprising the hollow shafts 34 and 41 is also supported by the same fixed structure through the bearings 50, which almost completely relieves the turbine shaft 5 from cantilever forces. The hubs of the propellers 2 and 3 can also be supported by this fixed structure through other roller bearings 53 and 54 respectively, such that the roller bearings connecting counter rotating bodies to each other and that turn at very high rotation speeds are not included herein. This embodiment is cinematically perfectly constructible and respects the required reduction ratios. In this embodiment and in the following embodiments, supply networks 52 (supply ducts and power supply cables) to control modules can be arranged along the fixed structure composed of the fixed casing elements 32 and 38. They pass through the second planetary gear system 27 between two of the shafts 36. The control modules 24 and 25 can also be placed adjacent to each other on the fixed structure, so that a simplified and probably smaller arrangement is achieved.

Another embodiment is shown in FIG. 3. This embodiment is similar to the previous embodiment and corresponding parts have identical reference numbers, except that the first planetary gear system 26 is replaced by another planetary gear system 126, in which the shafts 130 of the planet gears 31 are fixed to a conical hollow shaft 134 leading through the cylindrical hollow shaft 41 to the sun gears 35 and 40 of the other two planetary gear systems 27 and 28 that are not modified; at the same time, the external ring gear 133 of the first planetary gear system 126 is fixed to a fixed casing element 132. The advantages are similar to those in the previous embodiment; greater cohesion of the transmission due to the fixed structure passing through a principal element of each of the planetary gear systems 126, 27 and 28, and to the rotating body passing through another principal element of each of these planetary gear systems, with no counter rotating roller bearings, compact in size and with a better arrangement of the control modules and their electricity and fluid routing network; but in this case the reduction ratios are higher at the first planetary gear system 126, so that the next two planetary gear systems (27 and 28) can be made smaller reducing the cantilevered forward mass.

The embodiment in FIG. 4 is different from the previous embodiment in that the third planetary gear system 28 is replaced by another planetary gear system 228. Although the sun gear 40 is still fixed to the cylindrical hollow shaft 41, the ring gear 244 is now fixed to the downstream propeller 3, its planet gear carrier 250 is now fixed to the fixed casing element 45 and supports the end piece 251 of the aircraft propellers, which is therefore fixed, unlike in previous embodiments in which it was fixed to the downstream propeller 3. It may be preferable for the end piece 251 to be immobile. Other advantages of the previous embodiments are retained. In this case the planet gear gears 243 are doubled up and include a first portion 252 engaging with the sun gear 40 on one side of the planet gear carrier 250, and the other portion 253 engaging with the ring gear 244 on the other side of the planet gear carrier 250. In this design, the toothing 254 of the ring gear 244 may be surrounded by the portions 253 of the planet gears 243, and therefore extend inside these portions 253.

The invention claimed is:

1. Aircraft propulsion device comprising a drive shaft, a pair of propellers coaxial with the drive shaft, and a transmission between the drive shaft and the pair of propellers, the transmission including a planetary gearing speed reduction device for the drive shaft, the reduction device comprising a plurality of planetary gear systems each comprising a toothed sun gear, a toothed ring gear and toothed planet gears mounted on a planet gear carrier and each engaged with the sun gear and the ring gear, the sun gear, the ring gear and the planet gear carrier forming three principal elements of each planetary gear system, one of the principal elements of two of the planetary gear systems being fixed to one of the propellers, wherein there are three planetary gear systems, one of the principal elements of a first of said three planetary gear systems is fixed to the drive shaft, a second and a third of said three planetary gear systems comprise the principal elements fixed to the propellers, and one of the principal elements of each of the planetary gear systems is fixed to a fixed structure surrounding the drive shaft.

2. Device according to claim 1, wherein the elements fixed to the fixed structure are the planet gear carrier in the first planetary gear system, the planet gear carrier in the second planetary gear system and the ring gear in the third planetary gear system.

3. Device according to claim 2, wherein the ring gear in the first planetary gear system, the sun gear in the second planetary gear system and the sun gear in the third planetary gear system are fixed to each other and form a rotating assembly.

4. Device according to claim 1, wherein the principal elements fixed to the fixed structure are the ring gear in the first planetary gear system, the planet gear carrier in the second planetary gear system and the ring gear in the third planetary gear system.

5. Device according to claim 2, wherein the principal elements fixed to the propellers are the ring gear in the second planetary gear system and the planet gear carrier in the third planetary gear system.

6. Device according to claim 1, wherein the principal elements fixed to the fixed structure are the ring gear in the first planetary gear system, the planet gear carrier in the second planetary gear system and the planet gear carrier in the third planetary gear system.

7. Device according to claim 4, wherein in that the planet gear carrier in the first planetary gear system, the sun gear (35) in the second planetary gear system and the sun gear in the third planetary gear system are fixed to each other and form a rotating assembly.

8. Device according to claim 6, wherein the principal elements fixed to the propellers are the ring gear in the second planetary gear system and the ring gear in the third planetary gear system.

9. Device according to claim 1, wherein it comprises propeller control modules, and networks for supplying said modules, said networks extending along said fixed structure.

10. Device according to claim 9, wherein propeller control modules are placed adjacent to each other on the fixed structure.

11. Device according to claim 4, wherein the principal elements fixed to the propellers are the ring gear in the second planetary gear system and the planet gear carrier in the third planetary gear system.

12. Device according to claim 6, wherein the planet gear carrier in the first planetary gear system, the sun gear in the second planetary gear system and the sun gear in the third planetary gear system are fixed to each other and form a rotating assembly.

* * * * *